United States Patent [19]

Warner et al.

[11] 4,451,865
[45] May 29, 1984

[54] ELECTRICAL CUTOUT FOR UNDER VOLTAGE OR POWER LOSS CONDITIONS

[75] Inventors: Richard C. Warner, Morris Plains, N.J.; Thomas C. Laughon, Alpharette, Ga.

[73] Assignee: The Singer Company, Stamford, Conn.

[21] Appl. No.: 442,488

[22] Filed: Nov. 17, 1982

Related U.S. Application Data

[63] Continuation of Ser. No. 264,887, May 18, 1981, abandoned.

[51] Int. Cl.³ .......................... H02H 3/24; H02H 7/09
[52] U.S. Cl. ........................................ 361/23; 361/92; 361/114; 361/194
[58] Field of Search .................... 361/92, 23, 194, 114; 340/663

[56] References Cited

U.S. PATENT DOCUMENTS 2,985,800 5/1961 Cook ..................................... 361/23

Primary Examiner—Reinhard J. Eisenzopf
Attorney, Agent, or Firm—Edward P. Schmidt; Robert E. Smith; Edward L. Bell

[57] ABSTRACT

This disclosure relates to methods and apparatus for providing in a tool, appliance, or other electrically operated device the safety feature of requiring that the trigger or ON-OFF switch be in or returned to the OFF position before the tool will respond to placing the trigger or ON-OFF switch in the ON position.

4 Claims, 6 Drawing Figures

ELECTRICAL CUTOUT FOR UNDER VOLTAGE OR POWER LOSS CONDITIONS

REFERENCE TO RELATED APPLICATIONS

This is a continuation of application Ser. No. 264,887 filed May 18, 1981 and now abandoned.

FIELD OF THE INVENTION

This invention relates to electric tools and appliances and, more particularly to a safe power-on circuit and system for hand tools and other devices.

BACKGROUND OF THE INVENTION

People may be injured because they inadvertently pick up hand tools, such as routers and electric drills, by the trigger and then hold them against their bodies while plugging the power cords into the wall socket. As a result, the tool will start while the cutting tool or bit is in direct contact with the body, thereby causing injury.

In other instances, power may be inadvertently lost while a tool, appliance, or other device is in operation and the operator may neglect to turn off the device prior to power restoration. This situation again can lead to accidents including the risk of serious bodily injury.

Mechanical lock-out devices requiring a sequence of two or more purposeful actions be taken before the tool will operate have been previously suggested. These mechanical devices are not foolproof however, because the lock-out devices are completely mechanical in nature and the sequence of operations can be performed prior to operation of the tool and its connection to power, thereby leaving the tool in a cocked condition ready to operate immediately upon application of power. Such mechanical devices can also fail because the mechanical devices will not automatically release and require re-initialization following power failure. Unexpected start-up then can occur when power is reapplied.

OBJECTS OF THE INVENTION

Bearing in mind the foregoing it is a primary object of the present invention to provide methods, apparatus, systems, circuits, and means whereby such accidents can be actively prevented by the design of the tool.

Another primary object of the present invention is to help promote the safety of the users of electrically powered hand tools by preventing the accidental or unexpected startup of such devices caused by the trigger, or ON-OFF switch, being held in the ON state while the line cord is being plugged into the power socket, and thereby preventing injury in the event that the tool is being held against the body or is otherwise in a dangerous configuration.

Still another primary object of the present invention is the provision of methods, apparatus, systems, features and means for electrically powered tools or other devices requiring that the trigger or ON-OFF switch be in or subsequently returned to the OFF position in a tool or other device, especially a hand tool, when line power is applied to the tool, before the tool will respond to the trigger or ON-OFF switch being in the ON position. A major feature of the present invention lies in the ability to adapt an existing tool housing design to this invention without major modification of the housing itself, limiting modifications to the design of the switch in the tool or to the design of the plug of the line cord. If this were not the case, then it would be necessary, in many instances, to redesign the tool housing. This may be achieved by building the apparatus of the present invention into or housing it within the plug or cap of the tool or device line cord, requiring minimal modification of the tool housing. Alternatively, a similar simplicity of tool design change may often be achieved by incorporating the apparatus of the present invention as a part, portion, or modular attachment mounted directly to the switch or trigger control, enabling the entire unit to be installed substantially without modification or change to assembly or operation of the tool.

The invention resides in the combination, construction, arrangement and disposition of the various component parts and elements incorporated in improved safety circuits and systems for electric tools, portable electric tools, home appliances and other devices and in methods of operation incorporated in the same in accordance with the principles of this invention. The present invention will be better understood and objects and important features other than those specifically enumerated above will become apparent when consideration is given to the following details and description which, when taken in conjunction with the annexed drawing, describes, discloses, illustrates and shows certain preferred embodiments or modifications of the present invention and what is presently considered and believed to be the best mode of practicing the principles thereof. Other embodiments or modifications may be suggested to those having the benefit of the teachings herein, and such other embodiments or modifications are intended to be reserved, especially as they fall within the scope and spirit of the subjoined claims.

Yet still another primary object of the present invention, in addition to each of the foregoing objects is to provide such circuits and systems wherein the device is constructed of electromechanical devices providing physically disjunctive isolation of the motor from the power source.

SUMMARY OF THE INVENTION

In accordance with the present invention the safety circuit comprises a single-pole, double-throw switch, having a guaranteed BREAK-BEFORE-MAKE characteristic, provided as the trigger or ON-OFF switch, and a relay, of either an AC or DC variety suited to the type of power used for the tool, with a single MAKE (normally open) contact. Power is applied through line cord contacts connected across the relay coil when the tool is plugged into the power supply with the switch in the off position. Power is only subsequently applied to the tool through the relay contacts when the switch or trigger is moved to the ON position. The relay contacts are connected in parallel with the OFF contacts of the switch to maintain the relay actuated unless line power is subsequently lost. The circuit is completed by the motor or other load. This device, as depicted, is constructed of electro-mechanical devices providing physically disjunctive isolation of the motor from the power source. Alternate constructions could utilize semiconductors, including transistors, diodes, integrated circuits, silicon controlled rectifiers, triacs, microprocessors, and microcomputers. The relay, which is spoken of primarily as an AC relay, could be a DC relay used either in a bridge rectifier configuration, or in series with one diode while another is placed in parallel with the coil and oppositely polarized to the first diode and used as an arc-suppressor and decay path. The operation of the relay, or of solid state devices in its stead, could be part of a more complex operation, an operation that could, for example, require that the trigger or ON-OFF switch be in the OFF condition AND that a button be pressed in addition.

Another means of application of this invention is achieved by housing the relay inside the plug of a three-wire line cord. A major advantage of this configuration lies in the ability to adapt an existing tool housing design to this invention while limiting modifications to the design of the switch in the tool, the line cord, and the plug of the line cord. If this were not the case, then it would be necessary, in many instances, to redesign the tool housing to enable it to contain the relay.

DESCRIPTION OF THE DRAWING

While the specification concludes with claims particularly pointing out and distinctly claiming the subject matter which is regarded as forming the present invention, it is believed the invention will be better understood from the following detailed description when taken in conjunction with the annexed drawing which discloses, illustrates and shows a preferred embodiment or modification of the present invention and what is presently considered and believed to be the best mode of practicing the principles thereof and wherein:

DETAILED DESCRIPTION OF THE INVENTION

Figure 1:
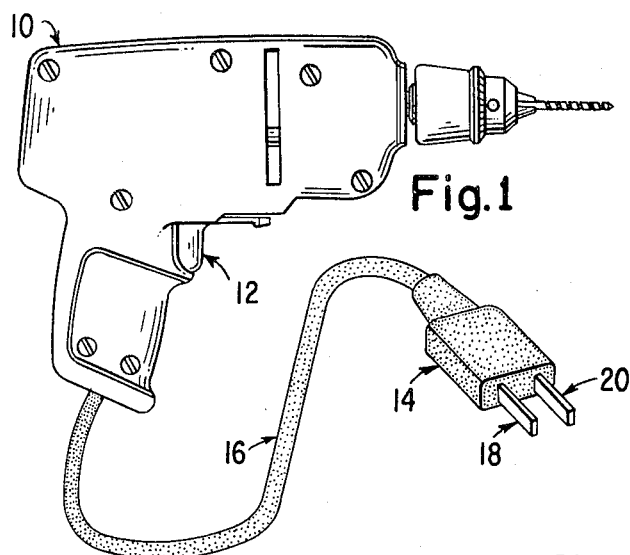
FIG. 1 is an electric drill embodying the present invention and shown connected via a line cord to a plug.

With reference now to the drawing, and particularly to FIG. 1 thereof, there is shown and illustrated a typical device or appliance, specifically a portable electric hand drill incorporating the present invention, the drill being designated generally by the reference character 10 and including a trigger or ON-OFF switch 12, a plug 14 for connecting the tool to an electric outlet (not shown) for providing energizing power thereto, and a line cord 16 connecting the drill 10 with the plug 14. The plug 14 carries a pair of spaced apart conductive prongs 18 and 20 of conventional form.

Figure 2:
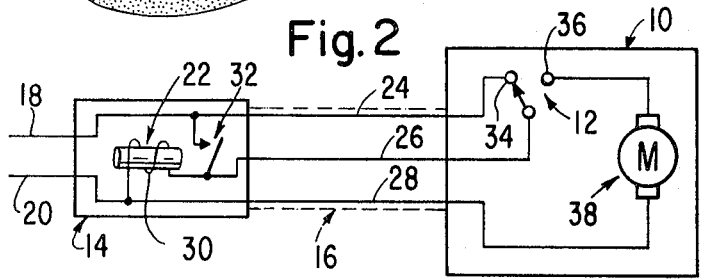
FIG. 2 is an electrical schematic of one embodiment of the invention wherein the safety system comprises a relay mounted within the plug.

In the various embodiments of the invention shown in FIGS. 2–6, the safety circuitry of the present invention may be housed wholly within the tool 10 or may be housed partially within and partially without the tool 10. Referring particularly to FIG. 2, there is shown and illustrated means of application of this invention which is achieved by housing a relay 22, inside the plug 14 with the line cord 16 being provided with three-wires 24, 26, and 28. The trigger or ON-OFF switch 12, which may be a simple ON-OFF control or part of a variable speed control, comprises a single-pole, double-throw switch (SPDT) having a guaranteed BREAK-BEFORE-MAKE characteristic. The relay 22, of either an AC or DC variety suited to the type of power used for the tool is provided with a coil 30 and a single MAKE (normally open) contact set 32. Power is applied through the line cord contacts 18 and 20 connected across the relay coil 30 when the tool is plugged into the power supply with the switch 12 in the OFF position 34. Power is only subsequently applied to the tool 10 through the relay contacts 32 when the switch or trigger 12 is moved to the ON position 36. The relay contacts 32 are connected in parallel with the OFF contacts 34 of the switch to maintain the relay 22 actuated unless line power is subsequently lost. The circuit is completed by the motor or other load 38. This device, as depicted, is constructed of electromechanical devices providing physically disjunctive isolation of the motor from the power source. Alternate constructions could utilize semiconductors, including transistors, diodes, integrated circuits, silicon controlled rectifiers, triacs, microprocessors, and microcomputers. The relay, which is spoken of primarily as an AC relay, could be a DC relay used either in a bridge rectifier configuration, or in series with one diode while another is placed in parallel with the coil and oppositely polarized to the first diode and used as an arc-suppressor and decay path. The operation of the relay, or of solid state devices in its stead, could be part of a more complex operation, an operation that could, for example, require that the trigger or ON-OFF switch be in the OFF condition AND that a button be pressed in addition.

A major advantage of this application lies in the ability to adapt an existing tool housing design to this invention while limiting modifications to the design of the switch in the tool and the plug of the line cord. If this were not the case, then it would be necessary, in many instances, to redesign the tool housing to enable it to contain the relay. Safety circuit equipped tool 10 is operated by first plugging the plug 14 of the line cord 16 into the power line in the normal manner. If the trigger switch 12 is released at this time, that is, in the OFF position, its OFF (normally closed) contact 34 will be closed, thereby causing the relay 22 to operate, in turn closing its single MAKE contact 32 which will form both a hold path for the relay coil 30 when the OFF side 34 of the trigger switch 12 opens, and an operate path for the motor 38 when the ON side 36 of the trigger switch 12 closes. If the trigger switch 12 is already operated, that is, in the ON position 36 with the OFF contact 34 open and the ON contact 36 CLOSED, the relay 22 will not operate because it will be connected to only one side 20 of the power line. The same will be true of the motor 38. When the trigger switch 12 is subsequently released, the relay 10 will operate as described above. If power fails and is then reapplied, assuming that the failure is of sufficient duration to allow the relay 22 to release, then the motor 38 will be deprived of power and will not restart until the trigger 12 is released and reoperated.

Figure 3:
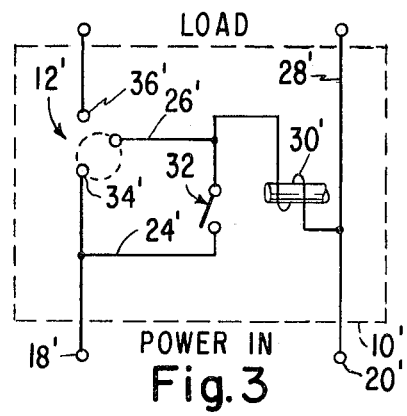
FIGS. 3 and 4 are electrical schematics of other embodiments of the invention.

In FIG. 3, there is shown and illustrated an embodiment or modification of the present invention executed in discrete components mounted together within an enclosure or housing 10', which functions identically to the circuit of FIG. 2, accordingly like reference characters have been used for the various component parts and elements as used previously with reference to FIG. 2, however, those which do not find identical counterparts have been primed. Hence, for example, the power input points have been designated 18' and 20' and the slide type ON-OFF switch has been designated 12'. The housing 10' could be physically separate from the tool or device, could be physically a part of or attachment to the tool or device, or could be the tool housing itself.

Figure 4:
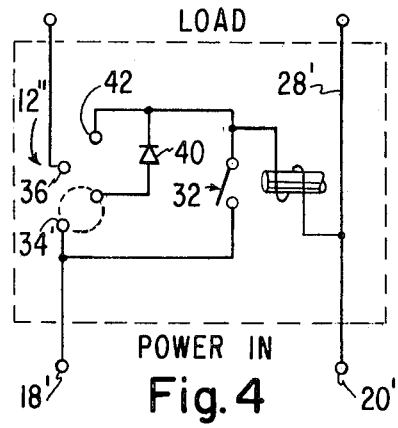

In FIG. 4, an embodiment or modification of the invention similar to that of FIG. 3 is shown, but the slide switch 12" is a three position one, the contacts 34' and 36' corresponding to the OFF contacts 34 and 34' of FIGS. 2 and 3. A diode 40, however, has been added in series with the first ON contact path to ON contact 36' so that half-wave rectification of the power supplied to the load in that first position, providing a "soft" start, i.e., on drawing reduced starting current in the case of a motor load such as the drill 10, and a slow speed operating condition. A secondary ON contact 42 is also provided to by-pass the diode 40 in a second or further position of the slide contact to provide full speed, full voltage and current operation while retaining the safety features of the present invention in either of the ON positions.

Figure 5:
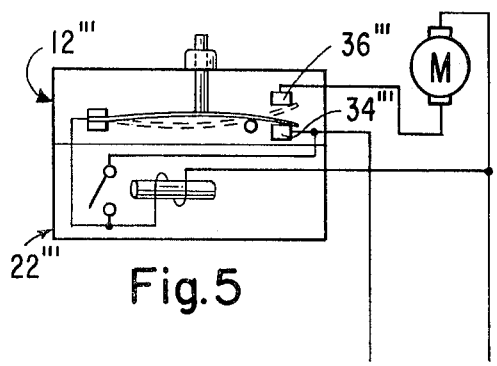
FIG. 5 is a schematic illustration of the invention applied to a modular control.

Many portable electric tools utilize trigger switch or trigger switch speed controls in the form of a modular capsule that is installed, for example, by being clamped between mounting and aligning ribs provided in the tool clam shell housing halves. Exemplary of such type of switch devices are the modular capsules shown in Frenzel U.S. Pat. Nos. 3,260,827; 3,548,136; and Re26,781. In FIG. 5, there is shown and illustrated an embodiment or modification of the present invention as applied to such a modular application. The switch 12''' is illustrated as a miniature push button snap action switch having a cantilevered bowed leaf spring which snaps between a first bowed monostable position (shown in FIG. 5 in solid lines) containing an OFF contact 34" and a second bowed non-stable shape, bent the other way (shown in broken line in FIG. 5), and contacting an ON contact 36'''. Piggybacked on the switch housing 12''' is a relay 22''' which is internally wired, as shown, with the switch contacts and externally wires, as also shown, with the motor and power cord.

Figure 6:
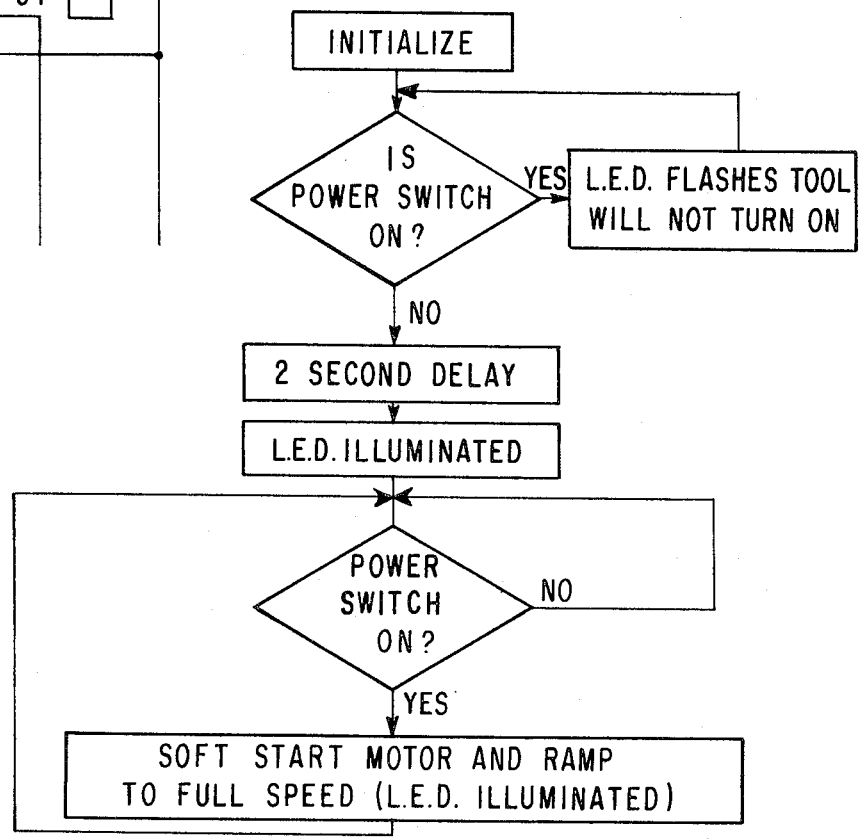
FIG. 6 is a flow chart of an execution of the present invention by microprocessor control.

Referring to FIG. 6, it will be appreciated that the sequence of events required of the switch, relay, etc., can also be executed by a microprocessor, using various interface devices, whether solid state of electromechanical. An appropriate flow chart is shown for this aspect of the microprocessor program loop.

In each of the above-detailed embodiments or modifications, the safety feature of requiring that the trigger or ON-OFF switch be in or returned to the OFF position in a hand tool before the tool will respond to placing the trigger or ON-OFF in the ON position is believed to be new.

It is to be expressly understood however, that the invention is by no means limited to the forms of embodiment described and illustrated which have been by way of example only. In particular, it comprises all the means constituting technical equivalence to means described as well as their combination, should the latter be carried out according to the spirit of the invention.

We claim:

1. In an electrically powered device, means for preventing the accidental starting-up of such a device by an ON-OFF switch being held in the ON state while the line cord is being plugged into the power socket, said means comprising no more than a single pair of current interrupting contacts electrically connected with said ON-OFF switch requiring that the ON-OFF switch be in or subsequently returned to the OFF position when power is applied to the tool, before the tool will respond to the ON-OFF switch being in the ON position; said ON-OFF switch comprising a single-pole, double-throw switch, having a guaranteed BREAK-BEFORE-MAKE characteristic and said current interrupting means comprises a relay having no more than a single MAKE (normally open) contact, the power being applied through line cord contacts connected across the relay coil through the trigger ON-OFF switch OFF contacts when the tool is plugged into the power supply with the switch in the OFF position.

2. Device of claim 1 wherein the relay MAKE contacts are connected in parallel with the OFF contacts of the switch to maintain the relay actuated unless line power is subsequently lost.

3. Device of claim 2 wherein said relay is mounted in the line cord in a plug portion thereof.

4. A safety circuit for electrically powered devices comprising a single-pole, double-throw ON-OFF switch, having a guaranteed BREAK-BEFORE-MAKE characteristic, and a relay with no more than a single pair of MAKE (normally open) contacts, the power being connected across the relay coil through the OFF contacts of said switch when the device is plugged into the power supply with the switch in the OFF position, said switch being also connected so that power is only subsequently applied to the device through the switch ON contacts which are connected in series with the relay MAKE contacts when the switch is moved to the ON position, the relay MAKE contacts being connected in parallel with the OFF contacts of the switch to maintain the relay actuated unless line power is subsequently lost.

* * * * *